June 18, 1935. W. W. SLOANE 2,005,567
FEEDER HEAD FOR SHAKER OR JIGGING CONVEYERS
Filed March 7, 1934 3 Sheets-Sheet 1
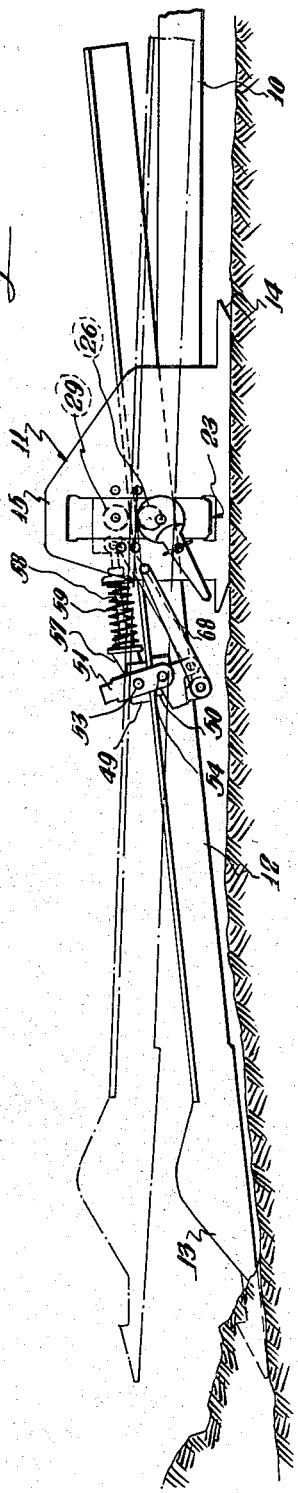
Inventor
William W. Sloane
Clarence F. Poole
Attorney

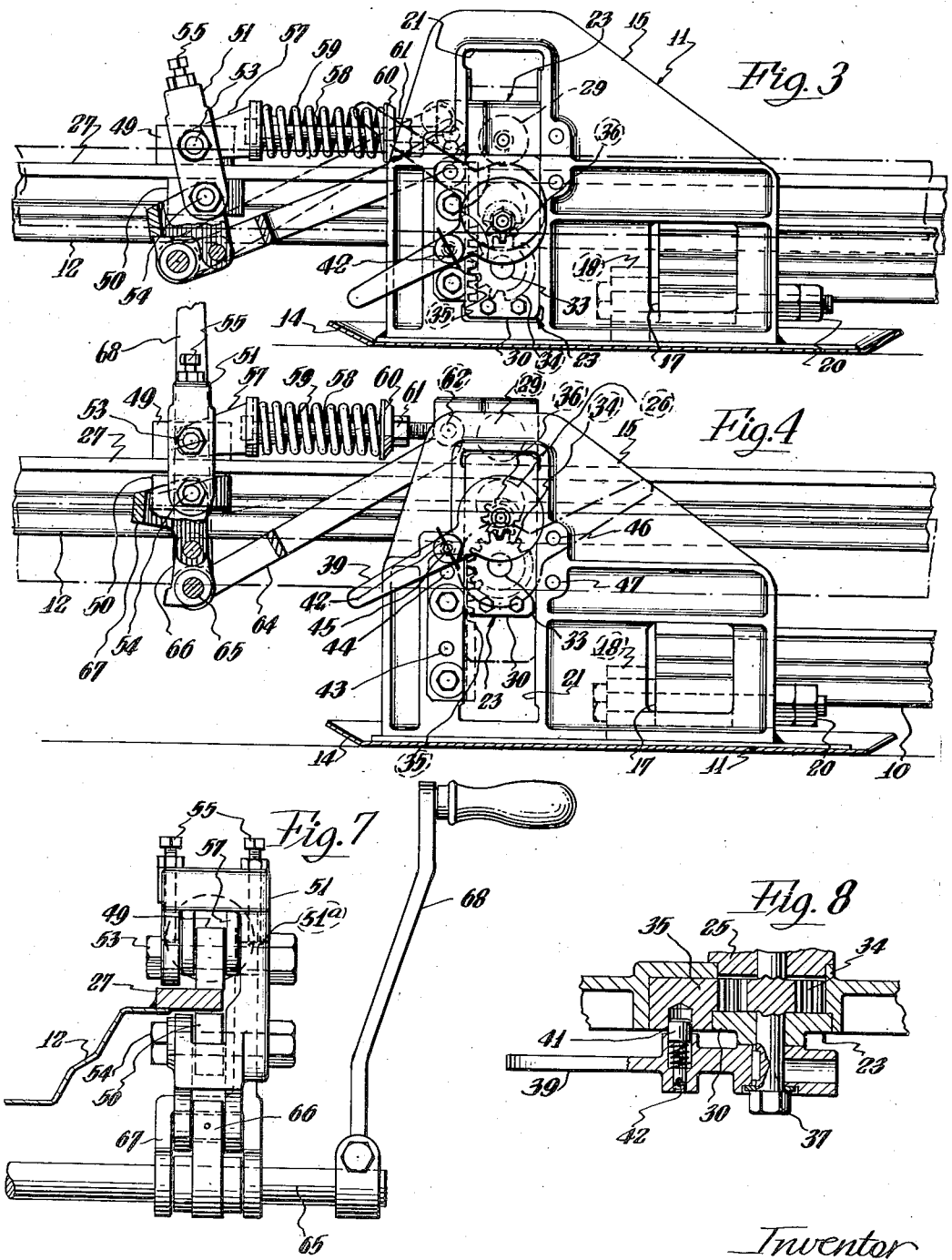

June 18, 1935.  W. W. SLOANE  2,005,567
FEEDER HEAD FOR SHAKER OR JIGGING CONVEYERS
Filed March 7, 1934  3 Sheets—Sheet 3
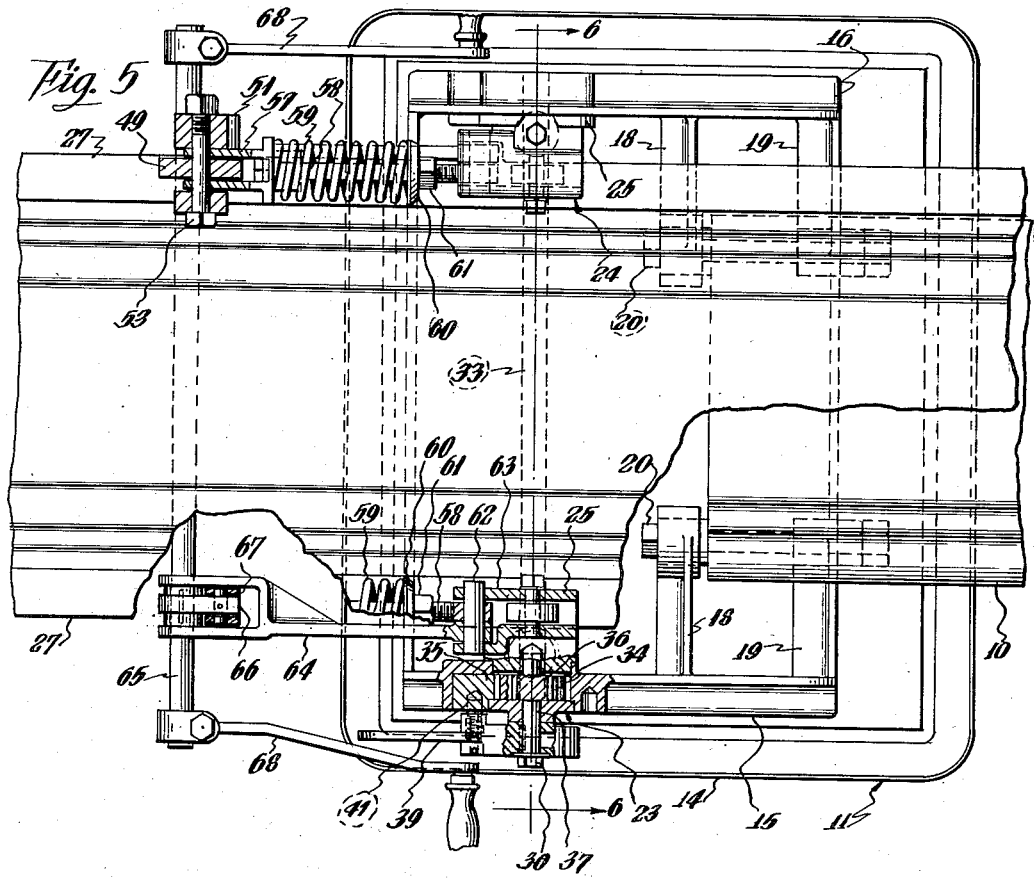
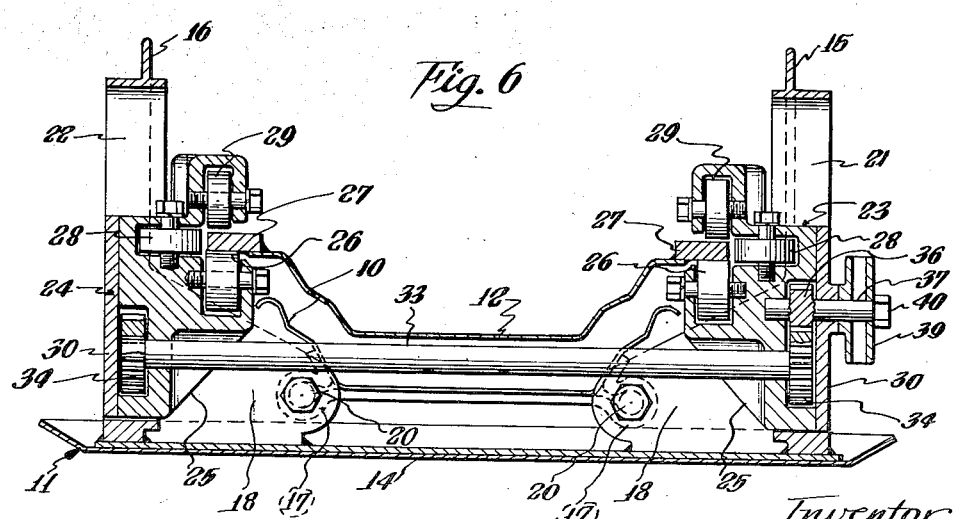
Inventor
William W. Sloane
Clarence F. Poole
Attorney Patented June 18, 1935

2,005,567

UNITED STATES PATENT OFFICE 2,005,567

FEEDER HEAD FOR SHAKER OR JIGGING CONVEYERS

William W. Sloane, Chicago, Ill., assignor to Goodman Manufacturing Company, Chicago, Ill., a corporation of Illinois Application March 7, 1934, Serial No. 714,427

20 Claims. (Cl. 198—220)

This invention relates to improvements in feeder heads for shaker or jigging conveyers of the type in which a telescoping trough is extended from or retracted within a conveyor trough by means of friction devices carried by a feeding head and engageable with and disengageable from said telescoping trough at will during certain periods of the forward and rearward stroke of the feeding head and main conveyer.

One of the objects of my invention is to provide a new and improved feeder head of a simplified construction particularly adapted for use in loading from benches or where the seams are pitching and the bottom is uneven.

The use of feeder heads in conjunction with shaker conveyers has heretofore been restricted due to the fact that it has been impracticable to load from benches or in seams having an uneven bottom or a high degree of pitch with respect to the main conveyer line. The device of my present invention overcomes these difficulties, in that it is constructed in a novel manner so as to be more flexible than the feeder heads in use at the present time, by permitting pivotal and vertical movement of the telescoping trough section with respect to the conveyer trough into which it discharges material, so that material may be loaded from a bench disposed a considerable distance above the mine bottom upon which the feeder head rests and in seams pitching at various angles with respect to the horizontal or main conveyer line.

Other objects of my invention will appear from time to time as the following specification proceeds.

My invention may be more clearly understood with reference to the accompanying drawings wherein:

Figure 1 is a side elevation of one embodiment of my invention showing the telescoping trough positioned for loading from a seam pitching in one direction;

Figure 2 is a side elevation of the device shown in Figure 1, showing the telescoping trough positioned for loading from a bench and showing the telescoping chute by broken lines, positioned for loading from a seam pitching in an opposite direction from that shown in Figure 1;

Figure 3 is an enlarged side elevation of the feeder head of the device shown in Figure 1, with parts broken away and in section to show certain details thereof;

Figure 4 is an enlarged side elevation of the device shown in Figure 1, with certain parts broken away and in section, and showing the mechanism in a different position of adjustment than is shown in Figure 3;

Figure 5 is an enlarged plan view of the device shown in Figure 3 with certain parts broken away and in section to more clearly show the details of my invention;

Figure 6 is a transverse sectional view taken substantially along line 6—6 of Figure 5;

Figure 7 is an enlarged detail view of a portion of the device embodying my invention showing certain details of the feeding mechanism in end elevation; and Figure 8 is an enlarged detail fragmentary horizontal sectional view showing certain details of the elevating mechanism of the device embodying my invention.

Like reference characters refer to like parts throughout the various figures.

Referring now to the details of construction of the embodiment of my invention illustrated in the drawings, the main elements thereof consist of a reciprocating trough section 10, a feeding head 11 and an extensible trough section or pick-up member 12, having a flared gathering shovel 13 integrally carried at its forward end in the usual manner.

The feeding head 11 includes a shoe 14 supported for sliding engagement on the ground or floor upon which the apparatus rests. The shoe 14 is provided with two upstanding side frame members 15 and 16. The feeding head 11 is suitably connected with the main reciprocating trough section 10 for reciprocation therewith in a suitable manner. In the form shown the main conveyer trough 10 is provided with a pair of laterally extending elongated eyes 17, 17 extending outwardly from opposite sides thereof, which eyes are adapted to be disposed between two pairs of upright flanges 18 and 19 extending inwardly from the side frames 15 and 16. Connecting bolts 20, 20 extend longitudinally through the flanges 18 and 19 and eyes 17, 17 to rigidly secure the feeder head 11 to the main conveyer.

The side frames 15 and 16 are provided with vertically extending guideways 21, 22, respectively, which carry supporting members 23 and 24 for vertical movement with respect thereto. The supporting members 23 and 24 each consist of an inwardly extending bracket portion 25 and an outwardly extending retaining portion 30 secured to the outer face of said bracket portion. The bracket portions 25, 25 have rollers 26, 26 carried thereby for engaging the under surface of laterally extending plates 27, 27 secured to and extending from the upper flanges of the extensible trough section 12. Rollers 28, 28 are carried in the inwardly extending bracket portions 25, 25 for engaging the sides of the laterally extending plates 27, 27 and rollers 29, 29 are also carried in the inwardly extending bracket portions 25, 25 for engaging the top surface of the laterally extending plates 27, 27 (see Figure 6). The extensible trough section 12 may thus be slidably carried by the supporting members 23 and 24 for slidable movement with respect to the feeding head 11 for extension from or retraction within the conveyer trough 10, and may also be rocked on the bottom rollers 26, 26 so as to permit pivotal adjustment of said extensible trough with respect to said conveyer trough.

The retaining members 30, 30 abut suitable shoulders formed on the outer sides of the guideways 21 and 22, respectively, while shouldered portions are provided in the bracket portions 25, 25 for abutting the inside of the side frames 15 and 16 adjacent the guideways 21 and 22, respectively, to hold the supporting members 23 and 24 from lateral movement with respect to said guides (see Figures 3, 5 and 8).

With reference now in particular to the novel means for vertically moving the supporting members 23 and 24 in the respective guideways 21 and 22, a transversely extending shaft 33 is journaled in the bracket portions 25, 25 of the supporting members 23 and 24 and has pinions 34, 34 keyed to its opposite ends, said pinions are carried in suitable recessed portions in alignment with the guideways 21 and 22 and mesh with vertical racks 35, 35. A pinion 36 meshes with one of the pinions 34 adjacent the supporting member 23 and is formed integral with a shaft 37 journaled in the inwardly extending portion 25 and member 30 and extending outwardly from said member.

An operating handle 39 is keyed to the outer end of the shaft 37 for rotating said shaft and pinion 36 and is held thereto by means of a nut 40 threaded on the end of said shaft. A spring pressed plunger 41, shown in detail in Figure 8, is provided in the operating handle 39 and is adapted to engage certain apertures formed in the outer face of the side frame 15 for holding the operating handle 39 and supporting members 23 and 24 in various fixed positions with respect to side frames 15 and 16. The spring pressed plunger 41 may be withdrawn from any aperture with which it is engaged by means of a suitable cross-pin 42. When the spring pressed plunger 41 engages the aperture 43, as in Figure 3, the supporting members 23 and 24 and extensible trough section 12 are supported in a lowered position with respect to the vertically extending guideways 21 and 22. As the operating handle 39 is rotated in a clock-wise direction, the spring pressed plunger 41 will register for engagement with the apertures 44, 46, 47 and 45 in the order named, until the supporting members 23 and 24 are in an uppermost position with respect to the guides 21 and 22, as is illustrated in Figure 4.

It may thus be seen that the extensible trough section 12 is supported for slidable movement with respect to the feeder head 11 in a horizontal plane, for pivotal movement with respect to said feeder head in a vertical plane, and for vertical adjustment with respect to the conveyer trough 10, so that said feeder head may be elevated to readily load from benches disposed above the conveyer trough 10. The trough section 12 may also be pivotally moved with respect to said conveyer trough in various directions about a transverse axis to load from seams pitching in various directions with respect to said conveyer trough. It will also be seen that a single operating lever and rack and pinion mechanism effects elevation or lowering of said conveyer trough in a simplified manner and that this operating lever is so arranged as to form a means for holding said extensible trough in various positions of vertical adjustment with respect to the ground.

Referring now in particular to the means for extending and retracting the extensible trough 12 with respect to the conveyer trough 10, and yet permitting the pivotal rocking movement of the extensible trough, as just described, two sets of vertically adjustable friction blocks are provided, each of which sets consist of blocks 49 and 50. The blocks 49 and 50 are mounted on a carrier 51, two of which carriers are provided, one at each side of the extensible trough 12 and in advance of the feeder head 11. The construction of the carriers 51, 51 and their respective sets of friction blocks 49 and 50 and the means for controlling operation of said blocks being similar, a description of one will apply to both.

Each carrier 51 is of a C-shaped formation having a vertical slot formed therein, which is opened to the inside, as is shown in Figure 7. The laterally extending plate of the extensible trough 11 extends into the side opening of the carrier 51 and the blocks 49 and 50 are disposed within the vertical slot in said carrier above and below said plate for selective engagement therewith. The blocks 49 and 50 are mounted on bolts 53 and 54. Set screws 55, 55 are provided to provide adjustment between the bolts 53 and 54 and take care of wear of the blocks 49 and 50, said carriers 51, 51 each having a vertically elongated aperture 51a for the bolt 53 to permit such adjustment.

A bifurcated member 57 is pivotally connected to the bolt 53 and extends rearwardly therefrom. A rod 58 is carried by the bifurcated member 57 for slidable movement with respect thereto and is encircled by a compression spring 59, one end of which spring abuts the bifurcated member 57 and the other end of which spring abuts a collar 60 held from movement with respect to said rod by means of a nut 61 threaded thereon.

An eye-piece is formed on the end of the rod 58, opposite the bifurcated member 57 and is pivotally carried on a pin 62, which pin in turn is carried in a bracket 63 extending forwardly from the inwardly extending portion 25 of the support member 23. Thus, the bifurcated member 57, rod 58 and compression spring 59 provide a yieldable pivotal connection between the feeding head 11 and carrier member 51. A link 64 is pivotally carried by the pin 62 and extends angularly downwardly therefrom on the outer side of the extensible trough section 12. The link 64 has a forked lower end which forms a pivotal support for a transversely extending shaft 65. The transversely extending shaft 65 has a pair of spaced lever arms 66, 66 secured thereto, the outer ends of which lever arms are pivotally secured to connecting links 67, 67, each of which connecting links are in turn pivotally secured to the lower bolt 54 of the carrier member 51. Operating handles 68, 68 are provided on opposite ends of the shaft 65, for controlling movement of said shaft.

When the blocks 49 and 50 are disengaged from the laterally extending plates 27, 27, the carrier members 51, 51 are supported in a generally upright position in advance of the feeder head and the operating handle 68 is also positioned in a generally upright position (see Figures 4 and 7). It is apparent that when the shaft 65 is rocked in one direction or another by means of either of the operating handles 68 that the grip blocks 49 and 50 will be engaged with or disengaged from the laterally extending plates 27 by means of the lever arm 66 and connecting link 67, which will pivot the carrier member 51 about the axis of pivotal connection of the bifurcated member 57 to said carrier. Thus, when the reciprocating conveyer section 10 is being reciprocably driven, engagement of the grip blocks 49 and 50 with the laterally extending plates 27 during the forward stroke of said conveyer section, and disengagement of said grip blocks from said plates during the rearward stroke of said conveyer section will extend the extensible trough section with respect to said reciprocating trough section, and in a contrary manner, engagement of said grip blocks with the plates 27 upon the rearward stroke of the reciprocating conveyer section 10 and disengagement of said grip blocks from said plates upon the forward stroke of said conveyer section will retract the extensible trough section within said reciprocating trough section.

When the blocks 49 and 50 are engaged with the laterally extending plates 27 and the gathering shovel 13 hits an obstruction, the compression springs 59, 59 will tend to be compressed, which will cause the carrier members 51, 51 to pivot about the axes of the bolts 54 against the links 64, 64 for disengaging said grip blocks from said plates and preventing injury to the trough or feeder mechanism.

It may thus be seen that the feeding mechanism for the feeder head 11, which includes the carrier members 51, grip blocks 49 and 50, operating handles 68 and connection between said operating handles and grip blocks, is disposed forwardly of the framework of said feeder head and is carried for pivotal movement with respect thereto in a vertical plane and for vertical adjustment with respect to the ground to permit the apparatus to be operated when the extensible trough section is inclined with respect to the shoe 14 and the shovel 13 is positioned either above or below said shoe, and also to permit feeding of said trough along a bench disposed at a substantial distance above said shoe, thus providing a more flexible feeding mechanism than has formerly been provided. It may also be seen that my improved device is arranged in a simplified manner constructed with a view towards utmost safety, efficiency and simplicity in operation.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated excepting as it may be limited in the appended claims.

I claim as my invention:

1. In a feeder head for a shaker conveyer, a shoe connectible to a conveyer trough section and reciprocably driven thereby, an extensible trough, supporting means for supporting said extensible trough on said shoe independently of said conveyer trough for movement therewith and for extensible or retractible movement with respect to said conveyer trough, said supporting means being supported for vertical adjustment with respect to said shoe and having forwardly extending feeding means pivotally mounted thereon and bodily movable therewith for extending and retracting said extensible trough with respect to said conveyer trough.

2. A feeder head for shaker conveyers slidable on the mine bottom and connectible to a conveyer trough for reciprocable movement therewith, an extensible trough having material engaging means at the forward end thereof, and supporting means for said extensible trough affording vertical and pivotal movement of said trough with respect to said feeder head including a pair of gripping members arranged for selective engagement with said extensible trough, means for controlling the gripping action of said gripping members relative to said extensible trough, said gripping members and said controlling means being mounted for vertical and pivotal movement with said supporting means.

3. A feeder head in accordance with claim 2 wherein guides extend upwardly from said shoe, wherein the supporting means consist of a pair of members vertically movable in said guides, and wherein a common operating member is provided for vertically moving said support members in said guides or holding said members in fixed relation with respect to said guides.

4. A feeder head in accordance with claim 2 wherein guides extend upwardly from said shoe, wherein the supporting means consists of a pair of members vertically movable in said guides, wherein a shaft is journaled in said members, and wherein pinions on said shaft mesh with racks on said guides for simultaneously moving said members in said guides.

5. A feeder head in accordance with claim 2 wherein guides extend upwardly from said shoe, wherein the supporting means consists of a pair of members vertically movable in said guides, wherein a shaft is journaled in said members, wherein pinions on said shaft mesh with racks on said guides for simultaneously moving said members in said guides, and wherein a pinion meshing with one of said pinions is provided for simultaneously rotating said pinions.

6. A feeder head in accordance with claim 2 wherein guides extend upwardly from said shoe, wherein the supporting means consists of a pair of members vertically movable in said guides, wherein a shaft is journaled in said members, wherein pinions on said shaft mesh with racks on said guides for simultaneously moving said members in said guides, wherein a pinion meshing with one of said pinions is provided for simultaneously rotating said pinions and wherein a manually operable operating member is provided for rotating said last-mentioned pinion or holding it in various fixed positions with respect to said members.

7. In a feeder head for a jigging conveyer and in combination with an extensible trough, a clamping device comprising a carrier in advance of said head having a pair of opposed friction blocks disposed above and below a portion of said extensible trough, a vertically movable member providing a sliding support for said trough, a link pivotally connected between said carrier and member adjacent the upper side of said trough, another link connected between said member and carrier adjacent the lower side of said trough, and a manually controlled device connected between said last-mentioned link and the lower end of said carrier for rocking said carrier into and out of inclined clamping position relative to said extensible trough.

8. A feeder head in accordance with claim 7, wherein the extensible trough is supported on the vertically movable member for slidable and pivotal movement with respect thereto and wherein the carrier member is pivotally movable with respect to the support member and is operable in various inclined positions with respect to the support member.

9. A feeder head in accordance with claim 7, wherein the feeder head is provided with upstanding guides, wherein the vertically movable member is movable in said guides and wherein a manually operated rack and pinion is provided for moving said support member in said guides or holding said support member in fixed relation with respect to said feeder head.

10. A feeder head in accordance with claim 7, wherein the feeder head is provided with upstanding guides, wherein the vertically movable member is movable in said guides, wherein the extensible trough is supported on said vertically movable member for slidable and pivotal movement with respect thereto, wherein the carrier member is pivotally movable with respect to the support member and wherein a manually operated rack and pinion is provided for moving said member in said guides or holding said member in fixed relation with respect to said feeder head.

11. In a feeder head for a jigging conveyer and in combination with an extensible trough, a clamping device comprising a carrier in advance of said head having a pair of opposed friction blocks disposed above and below a portion of said extensible trough, a link pivotally connected between said carrier and feeder head above the upper side of said trough, another link connected to said feeder head for pivotal movement about an axis coaxial with the axis of pivotal movement of said first-mentioned link, a connection between the opposite end of said last-mentioned link and the lower side of said carrier, an operating member including a transversely extending shaft supported by said last-mentioned link, said connection between said link and said carrier including an operative connection between said operating member and carrier for rocking said carrier with said first-mentioned link acting as a floating fulcrum into and out of inclined clamping position relative to said extensible trough when said extensible trough is in various positions of angular and vertical adjustment with respect to the ground.

12. A feeder head in accordance with claim 11, wherein the connection between the operating member and carrier comprises a lever arm pivotally movable about the axis of pivotal connection between said last-mentioned link and operating member and a link connecting said lever arm with said carrier.

13. In a feeder head for shaker conveyers, a conveyer trough, an extensible trough adapted to be nested therein and extended or retracted with respect thereto and having material engaging and gathering means on the forward end thereof, and means for extending or retracting said extensible trough with respect to said conveyer trough and supporting said extensible trough for loading from an uneven bottom or pitching seam comprising a carrier member, a pair of gripping devices carried thereby in advance thereof and adapted to be engaged with or disengaged from said extensible trough, and a member vertically movable with respect to the mine bottom carrying said carrier member and engaging said extensible trough and forming a vertically movable support for supporting said extensible trough for pivotal and slidable movement with respect to the ground.

14. In a feeder head for shaker conveyers, a conveyer trough, means adapted to be retracted within or extended from said conveyer trough and provided with means for picking up material and discharging it onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a carrier member having a pair of gripping devices carried thereby adapted to engage said extensible trough, and a vertically movable support member disposed rearwardly of said gripping devices forming a pivotal supporting means for said carrier member and having supporting engagement with said extensible trough.

15. In a feeder head for shaker conveyers, a conveyer trough, means adapted to be retracted within or extended from said conveyer trough and provided with means for picking up material and discharging it onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a shoe secured to the forward end of said conveyer trough for movement therewith, a pair of side walls extending upwardly from said shoe adjacent opposite sides thereof, a support member carried for vertical movement in each of said side walls, means on said support members engaging said extensible trough and permitting pivotal movement of said trough with respect to said support members, and a carrier member carried by each of said support members in advance of said members for pivotal movement with respect thereto having a pair of grip blocks thereon adapted to selectively engage said conveyer trough.

16. In a feeder head for shaker conveyers, a conveyer trough, means adapted to be retracted within or extended from said conveyer trough and provided with means for picking up material and discharging it onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a shoe secured to the forward end of said conveyer trough for movement therewith, a pair of side walls extending upwardly from said shoe adjacent opposite sides thereof, a support member carried for vertical movement in each of said side walls, means forming a supporting engagement between said support members and said extensible trough permitting pivotal movement of said trough with respect to said support members, a carrier member carried by each of said support members for pivotal movement with respect thereto having a pair of grip blocks thereon adapted to selectively engage said conveyer trough, and means for vertically moving said support members with respect to said side walls and holding said support members in various positions of adjustment with respect to said shoe.

17. In a feeder head for shaker conveyers, a conveyer trough, means adapted to be retracted within or extended from said conveyer trough provided with means for picking up and discharging material onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a shoe secured to the forward end of said conveyer trough for movement therewith, a pair of side walls extending upwardly from said shoe adjacent opposite sides thereof, a support member carried for vertical movement in each of said side walls, means forming a supporting engagement between said support members and said extensible trough permitting pivotal movement of said trough with respect to said support members, a carrier member carried by each of said support members for pivotal movement with respect thereto having a pair of grip blocks thereon adapted to selectively engage said conveyer trough, and means for vertically moving said support members with respect to said side walls comprising a rack, a gear meshing therewith and means for rotating said gear.

18. In a feeder head for shaker conveyers, a conveyer trough, means adapted to be retracted within or extended from said conveyer trough provided with means for picking up and discharging material onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a shoe secured to the forward end of said conveyer trough for movement therewith, a pair of side walls extending upwardly from said shoe adjacent opposite sides thereof, vertical guides associated with said side walls, support members carried by said guides for movement therealong, means for supporting said conveyer trough on said support members for pivotal and slidable movement, and manually operable means for vertically moving said support members along said guides and holding said support members in various positions of adjustment with respect to said guides including a common operating member.

19. In a feeder head for shaker conveyers, a conveyer trough, means adapted to be retracted within or extended from said conveyer trough provided with means for picking up and discharging material onto said conveyer trough comprising an extensible trough having a shovel on its forward end, means for extending or retracting said extensible trough with respect to said conveyer trough and supporting said extensible trough for movement about a horizontal axis and for vertical movement with respect to the mine bottom comprising a shoe secured to the forward end of said conveyer trough for movement therewith, a pair of side walls extending upwardly from said shoe adjacent opposite sides thereof, vertical guides associated with said side walls, support members carried by said guides for movement therealong, means for supporting said conveyer trough on said support members for pivotal movement with respect thereto and for slidable movement therealong, means for moving said extensible trough with respect to said support members comprising a carrier member disposed forwardly of each of said support members and pivotally connected thereto and having gripping members thereon adapted to engage said extensible trough, manually operated means for engaging said gripping members with or disengaging said gripping members from said extensible trough and manually operable means for vertically moving said support members along said guides and holding said support members in various positions of adjustment with respect to said guides including racks in said guides, pinions meshing therewith, a common shaft to which said pinions are secured and a common operating member for rotating said pinions.

20. In combination with a shaker conveyer, a reciprocably driven conveyer trough, a feeder head including a shoe connected to the forward end of said conveyer trough for movement therewith, an extensible trough supported on said feeder head, a clamping device supported on said feeder head for extending said extensible trough from or retracting said extensible trough within said conveyer trough comprising a carrier disposed in advance of said shoe and head having a pair of opposed friction blocks disposed above and below a portion of said extensible trough, a link pivotally connecting said carrier with said feeder head at a point disposed above the upper side of said trough, another link connected to said feeder head for movement about an axis coaxial with the axis of pivotal connection of said first-mentioned link to said feeder head, a connection between the opposite end of said last-mentioned link and the lower side of said carrier, an operating member including a transversely extending shaft supported by said last-mentioned link in advance of said feeder head, said connection between said last-mentioned link and carrier including an operative connection between said operating member and carrier for rocking said carrier with said first-mentioned link acting as a floating fulcrum into and out of inclined clamping position relative to said extensible trough when said extensible trough is in various angular positions with respect to said conveyer trough and head.

WILLIAM W. SLOANE.